US009983863B2

(12) United States Patent
Ashok et al.

(10) Patent No.: US 9,983,863 B2
(45) **Date of Patent: *May 29, 2018**

(54) METHOD TO OPTIMIZE PROVISIONING TIME WITH DYNAMICALLY GENERATED VIRTUAL DISK CONTENTS

(71) Applicant: International Business Machines Corporation, Armonk, NY (US)

(72) Inventors: Rohith K. Ashok, Apex, NC (US); James K. Kochuba, Raleigh, NC (US); Jose I. Ortiz, Raleigh, NC (US); Aaron J. Quirk, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/485,718

(22) Filed: Sep. 13, 2014

(65) Prior Publication Data

US 2015/0012703 A1 Jan. 8, 2015

Related U.S. Application Data

(63) Continuation of application No. 13/934,228, filed on Jul. 3, 2013.

(51) Int. Cl.

*G06F 9/445* (2018.01)
*G06F 9/455* (2018.01)
*G06F 3/06* (2006.01)

(52) U.S. Cl.

CPC .................. *G06F 8/63* (2013.01); *G06F 8/60* (2013.01); *G06F 9/45533* (2013.01);

(Continued)

(58) Field of Classification Search

None

See application file for complete search history.

(56) References Cited

U.S. PATENT DOCUMENTS 7,356,679 B1 4/2008 Le et al.
7,788,477 B1 8/2010 Huang et al.

(Continued)

FOREIGN PATENT DOCUMENTS

EP 2587375 A1 5/2013

OTHER PUBLICATIONS

Chen, Zhi Xian, et al. "IBM Workload Deployer: Pattern-based Application and Middleware Deployments in a Private Cloud." International Business Machines Corporation (2012).*

(Continued)

*Primary Examiner* — Mark D Featherstone
*Assistant Examiner* — Diedra McQuitery
(74) *Attorney, Agent, or Firm* — Patterson + Sheridan, LLP

(57) ABSTRACT

Distribution of middleware binary includes: receiving a request to deploy a workload with middleware service(s); selecting a base operating system (OS) image to host the middleware service(s); determining locations of binary file (s) for the middleware service(s) in a repository on a storage system; cloning a virtual disk containing the base OS image on the storage system; and copying the binary file(s) from the locations in the repository into the cloned virtual disk on the storage system. The binary file(s) are copied onto the virtual disk directly on the storage system, without the need to traverse a network interface. The base OS image is augmented with the binary files just prior to the deployment of the virtual machine (VM).

4 Claims, 5 Drawing Sheets

Receive request to deploy workload with middleware service(s) — 501
Select base OS image to host middleware service(s) — 502
Retrieve files and services available on base OS image — 503
Compare files and services available on base OS image with files and services required by workload — 504
Create delta list of files and services — 505
Query image repository on storage system for previously modified base OS image matching delta list — 506
Exist? — 507 (Yes / No)
Clone virtual disk containing previously modified base OS image in image repository — 508
Determine repository location of binary files for middleware service(s) — 509
Clone virtual disk containing base OS image on storage system — 510
Mount cloned virtual disk via target hypervisor — 511
Copy binary files from image repository directly into cloned virtual disk on storage system — 512
Configured mounted file system — 513
Unmount cloned virtual disk containing binary files — 514
Store cloned virtual disk containing binary files in image repository — 515
Attach cloned virtual disk containing binary files to virtual machine created to host middleware service(s) — 516
Boot virtual machine — 517

(52) U.S. Cl.
CPC .......... *G06F 9/45558* (2013.01); *G06F 3/065* (2013.01); *G06F 2009/4557* (2013.01); *G06F 2009/45562* (2013.01)

(56) References Cited

U.S. PATENT DOCUMENTS

| | | | | |
|---|---|---|---|---|
| 7,870,153 | B2 | 1/2011 | Croft et al. | |
| 2006/0025985 | A1 | 2/2006 | Vinberg et al. | |
| 2007/0233698 | A1 | 10/2007 | Sundar et al. | |
| 2010/0042796 | A1 | 2/2010 | Vasilevsky et al. | |
| 2011/0126197 | A1 | 5/2011 | Larsen et al. | |
| 2011/0161952 | A1* | 6/2011 | Poddar | G06F 9/455 717/173 |
| 2012/0084769 | A1 | 4/2012 | Adi et al. | |
| 2012/0180035 | A1 | 7/2012 | Poddar et al. | |
| 2013/0007726 | A1 | 1/2013 | Poddar et al. | |
| 2013/0007739 | A1* | 1/2013 | Poddar | G06F 8/63 718/1 |
| 2013/0055251 | A1 | 2/2013 | Anderson et al. | |
| 2014/0344809 | A1 | 11/2014 | Jin et al. | |

OTHER PUBLICATIONS

Peter Mell et al., "The NIST Definition of Cloud Computing," Version 15, Oct. 7, 2009, 2 pages.

* cited by examiner

METHOD TO OPTIMIZE PROVISIONING TIME WITH DYNAMICALLY GENERATED VIRTUAL DISK CONTENTS

BACKGROUND

In the provisioning of cloud workloads, virtual machines (VMs) are deployed to the cloud to host middleware services and binary files for middleware services or applications are distributed to the virtual machines (VMs). One existing approach to the distribution of binary files is to pre-package a VM template with a virtual disk that includes the binary files. For example, different hypervisors for creating and running the VM template may be offered that are fully separate from the other and have their own set of virtual disks. Furthermore, each version of the hypervisors may have a subset of images for different levels, resulting in a large matrix of various virtual disk levels that must be managed carefully at build time and provisioning time.

Another existing approach is to create a common virtual disk template that contains only a small subset of common function such as an operating system (OS) and other common monitoring packages and does not contain all the binary files for middleware services and applications. At the time of deploying a VM, the common image is provisioned from the common virtual disk template to the cloud and the binary files are downloaded from elsewhere via network connection to the new VM.

SUMMARY

According to one embodiment of the present invention, a method for middleware binary distribution receives a request to deploy a workload with one or more middleware services. A base operating system image to host the one or more middleware services is selected, and locations of one or more binary files for the one or more middleware services in a repository on a storage system are determined. A virtual disk containing the base operating system image are cloned on the storage system, and the one or more binary files from the locations in the repository are copied into the cloned virtual disk on the storage system.

System and computer program products corresponding to the above-summarized methods are also described and claimed herein.

DETAILED DESCRIPTION

Figure 1:
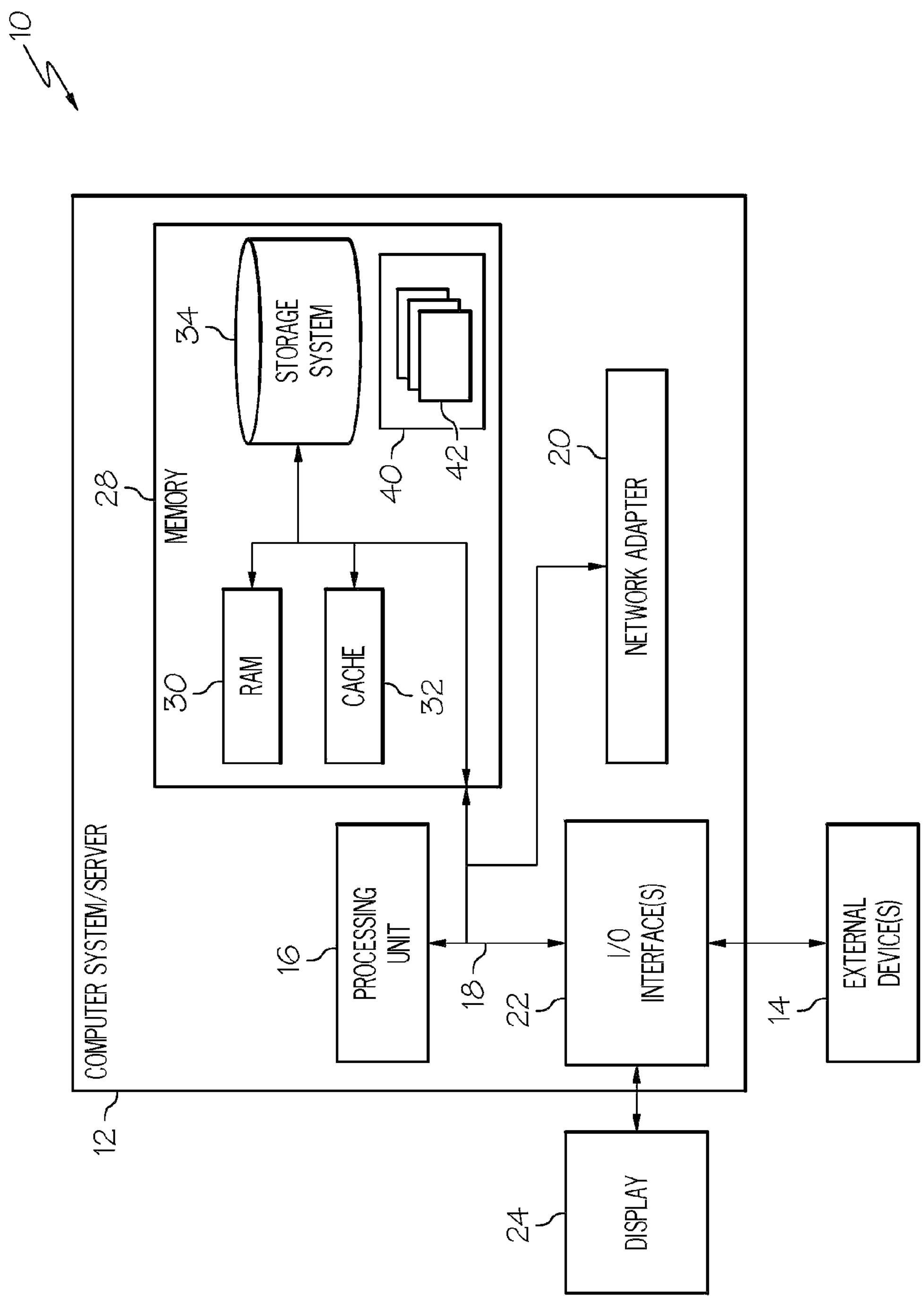
FIG. 1 depicts a cloud computing node according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an Information Disclosure Statement filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
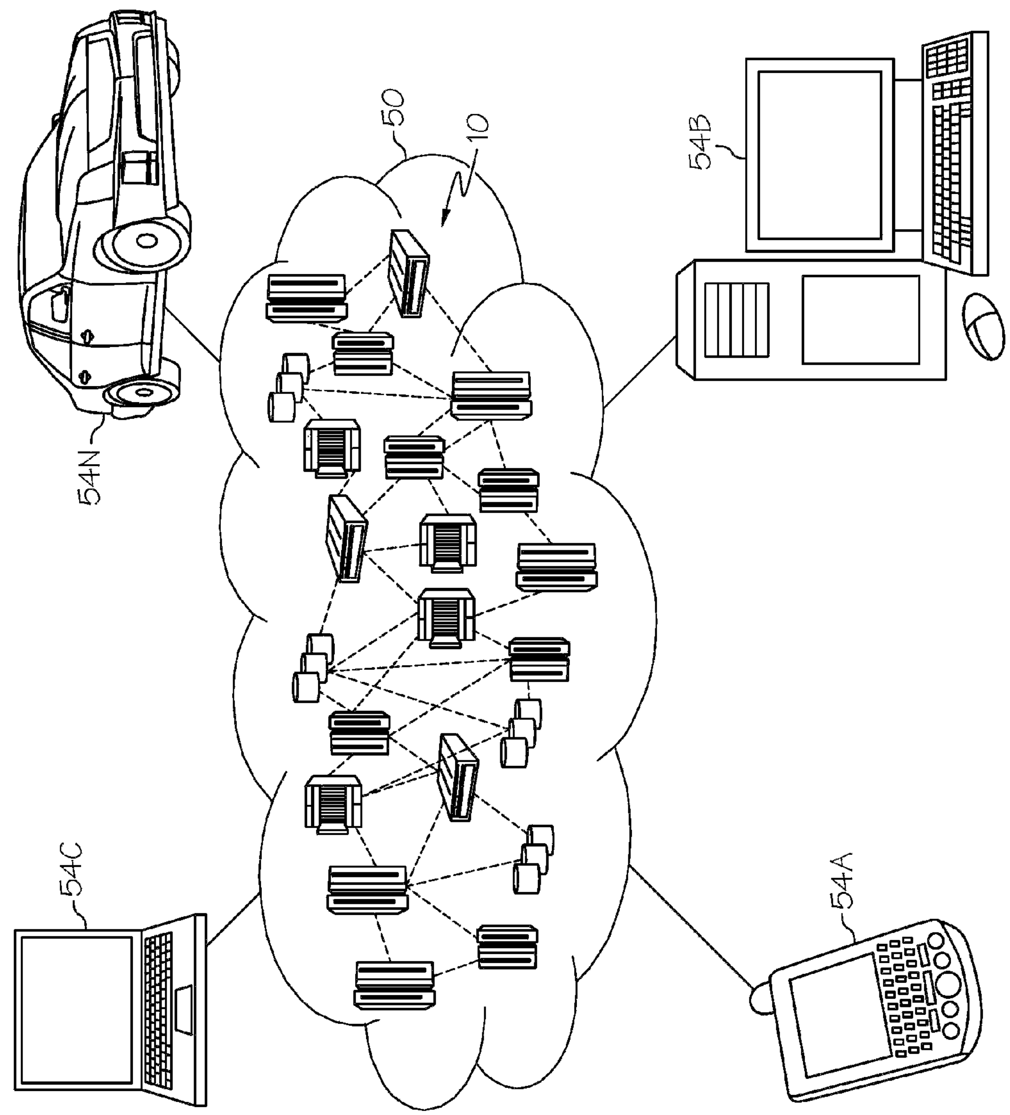
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
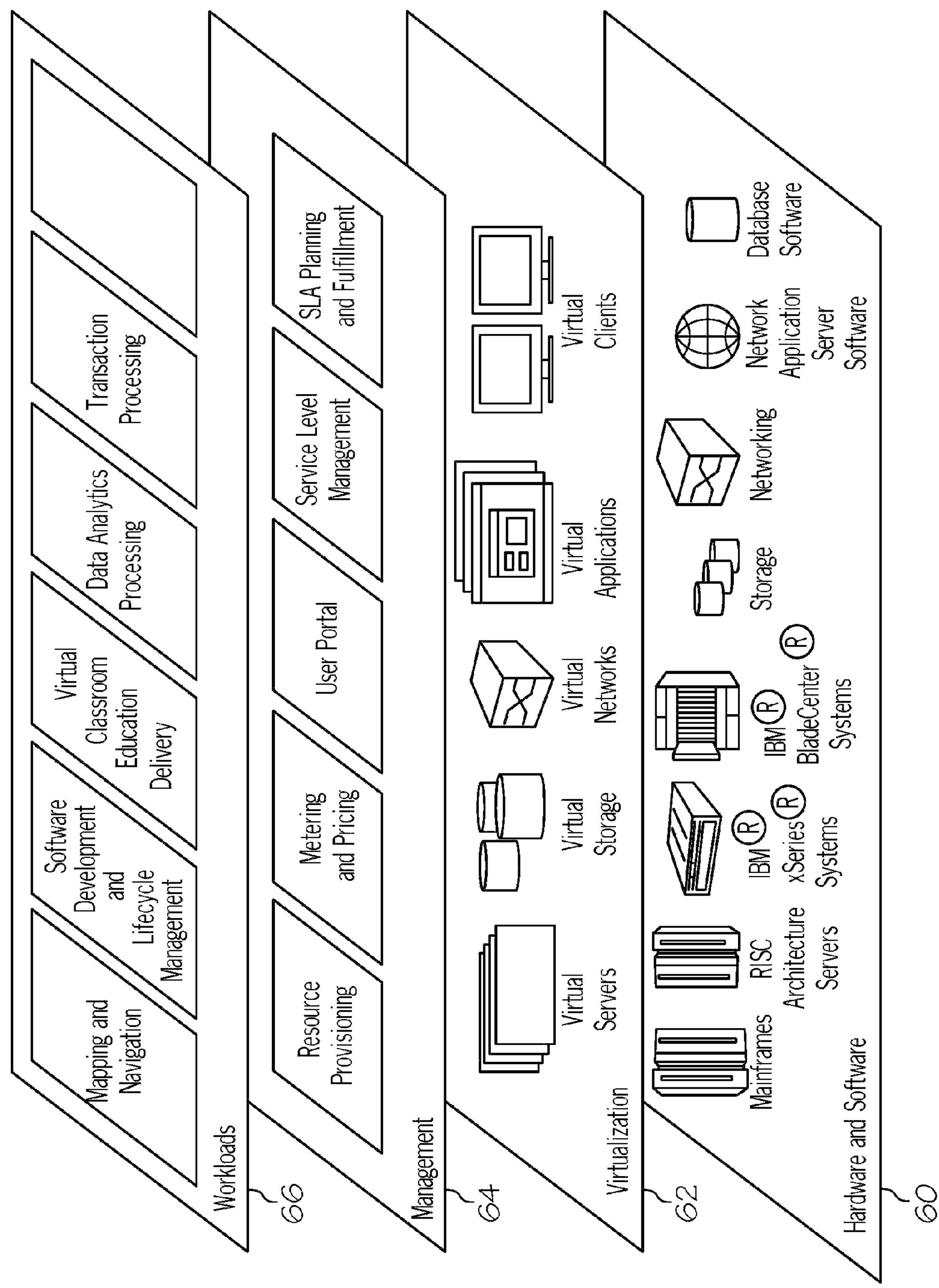
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Embodiments of the present invention for middleware binary distribution are advantageous for both management overhead at build time and performance overhead at deployment time. This is in contrast to the existing approach described herein above for a virtual disk without all the binary files needed for middleware services and applications, which allows a simpler build process, but comes at the added cost of transferring middleware binaries across a network and reduces performance (e.g. slow deployment and scaling reaction causing wasted resources for duplication). In embodiments disclosed herein, "middleware binary" refers to the application binaries that will run in the virtualization layer 62 (see FIG. 3), and the deployment of the middleware services are preferably part of a platform-as-a-service model. With embodiments of the present invention, an operating system (OS) base image is created and stored at build time in hardware and software layer 60 and then is augmented with the binary files for middleware service(s) just prior to the deployment of the virtual machine (VM) for hosting the middleware services and after a request is received to deploy the workload with the middleware services. This augmented OS base image is made in hardware and software layer 60, directly on the storage, and provides a virtual disk that is then deployed as virtual storage in virtualization layer 62 in FIG. 3. The virtual disk contains the files for the OS and the requested middleware services when the VM is booted as part of the virtualization layer 62. Embodiments of present invention leverage the fact that an application binary repository is on the same storage system as the virtual disk in the hardware and software layer 60, prior to the deployment of the virtual disk and VM to the virtualization layer 62. This allows the binary files to be copied onto the virtual disk directly on the storage system, without the need to traverse a virtualized network interface. This results in an overall reduction in provisioning time and better utilization of infrastructure resources, especially when many VM's are continuously being deployed and destroyed in an enterprise environment.

Figure 4:
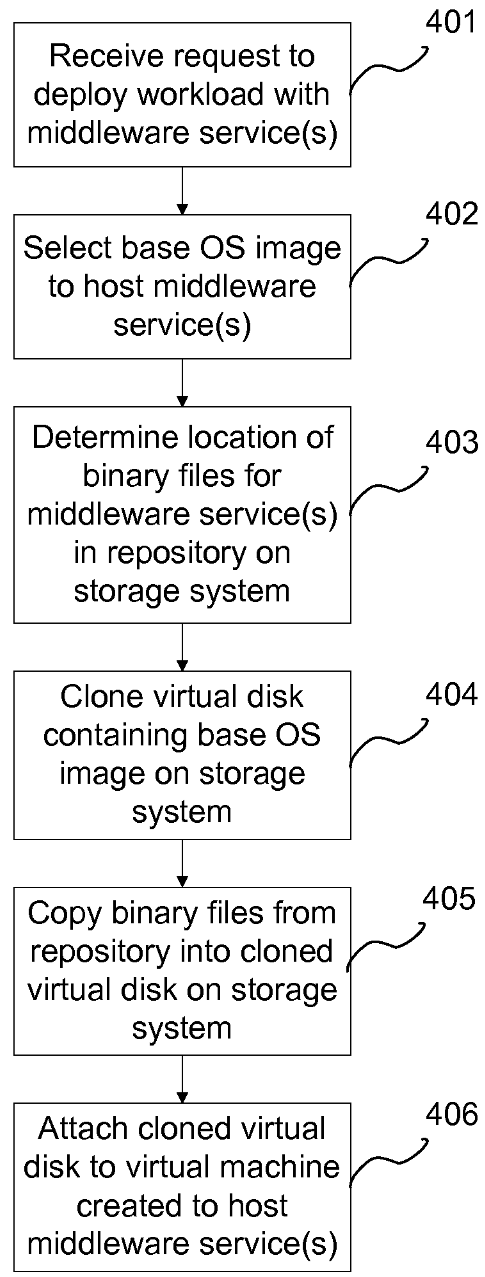
FIG. 4 is a flowchart illustrating a method for middleware binary distribution according to an embodiment of the present invention.

FIG. 4 is a flowchart illustrating a method for middleware binary distribution according to an embodiment of the present invention. In this embodiment, the method is implemented by a cloud management software running in layer 64 (see FIG. 3), preferably as part of an IaaS. A user would initiate a deployment of a VM, and in response, the cloud management software would execute computer program code to perform the method. First, the method receives a request to deploy a workload with one or more middleware services (401). In response, the method selects the base OS image that will host the middleware services (402). The method determines the locations of the binary files, for the middleware services that are not in the base OS image, in a reposition on a storage system (403). The method clones a virtual disk containing the base OS image onto the storage system (404), and copies the binary files from the repository into the cloned virtual disk on the storage system (405). In this embodiment, the binary files are copied directly into the cloned virtual disk, i.e., the binary files retrieved in step 403 resides on the same storage system as the virtual disk. The method may then attach the cloned virtual disk that includes the binary files to a VM that was created to host the middleware services (406). Thus, when the VM is booted, the binary files are already present. No transfer of the binary files over a network connection is required. No installation of the binary files through the OS after the VM is booted is required.

Figure 5:
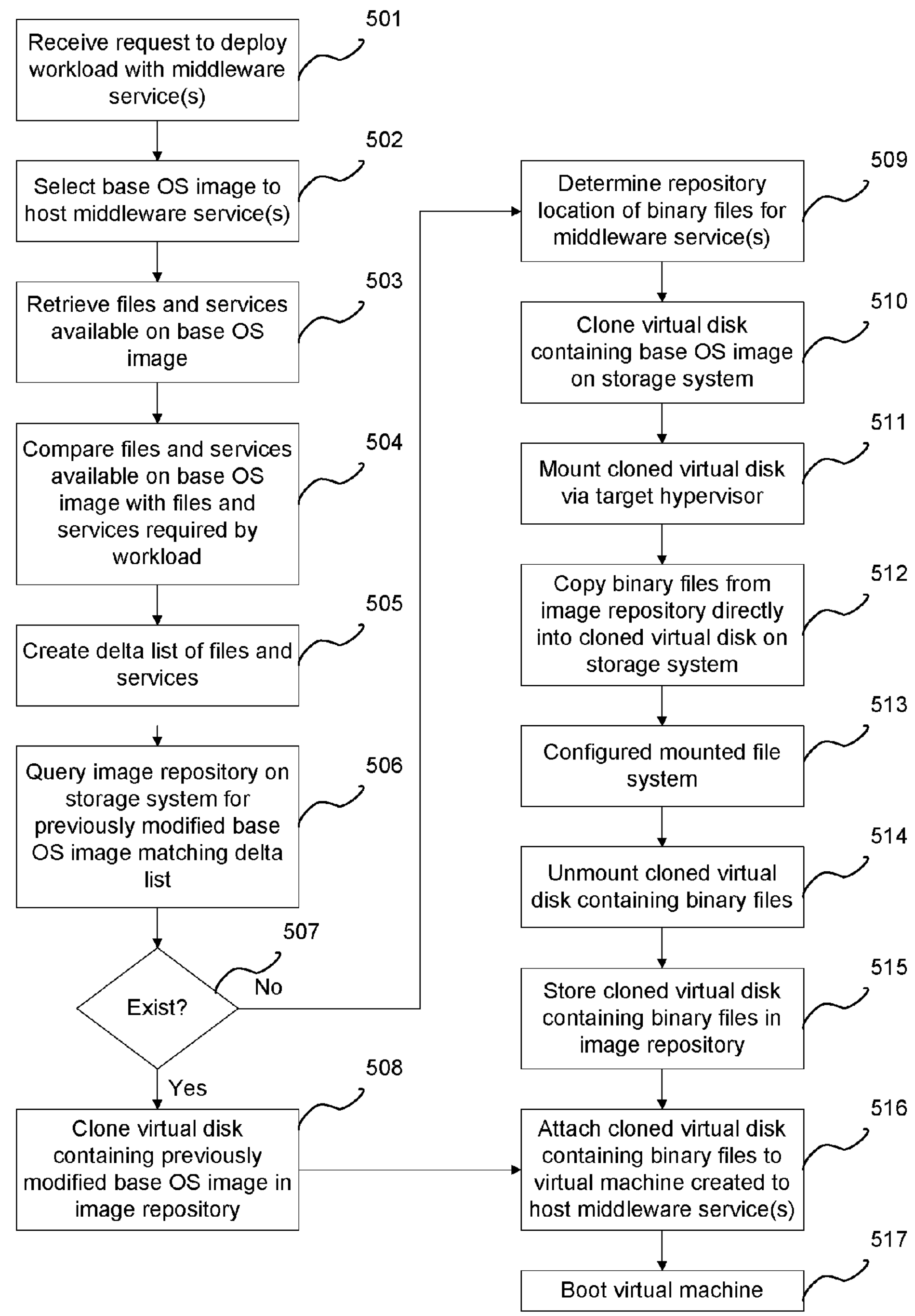
FIG. 5 is a flowchart illustrating in more detail the method for middleware binary distribution according to an embodiment of the present invention.

FIG. 5 is a flowchart illustrating in more detail the method for middleware binary distribution according to an embodiment of the present invention. First, the request receives a request to deploy a workload with one or more middleware services (501). In response, the method selects the base OS image that will host the middleware services (502). The method then retrieves the files and services available on the base OS image from a database (503) and compares these files and services with the files and services required by the workload (504). From this comparison, the method creates a delta list of files and services (505). The method then queries an image repository on a storage system for a previously modified base OS image matching the delta list (506). When such a previously modified base OS image exists (507) (i.e., the image repository found a virtual disk image which already contains the binary files for the middleware services), the method clones the previously modified base OS image found in the image repository (508). The method attaches the cloned virtual disk containing the binary files required by the workload to a VM created to host the middleware services (516).

When such a previously modified base OS image does not exist in the image repository (507), the method determines the repository location of the binary files for the middleware services (509). The method then clones a virtual disk containing the base OS image on the same storage system on which the image repository resides (510). The method temporarily mounts the cloned virtual disk via a target hypervisor (511). Here, the hypervisor is a piece of computer software, firmware, and/or hardware that creates the VM. The method then copies the binary files from the image repository directly into the cloned virtual disk on the storage system (512). Optionally, the mounted file system may also be configured (513). The method then unmounts the cloned virtual disk containing the binary files (514). Optionally, the method may store the cloned virtual disk containing the binary files in the image repository for possible future use (515). The method attaches the cloned virtual disk containing the binary files to the VM created to host the middleware services (516). The VM may then be deployed. When the VM is booted (517), the binary files for the middleware services are already present.

In this manner, the binary files needed for the requested middleware services are dynamically determined after receiving the request for the middleware services and just before deployment of the VM hosting the middleware services.

Although the embodiments of the present invention as described above in the context of binary files for middleware services, other types of files and/or services may be used without departing from the spirit and scope of the present invention.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for middleware binary distribution comprising:

receiving a request to deploy a workload via a target hypervisor with a plurality of middleware services by at least one computing processor;

prior to deployment of a virtual machine in response to the request, creating, at build time, a base operating system image to host the plurality of middleware services;

storing, at build time, the base operating system image on a storage system;

selecting the base operating system image by the at least one computing processor, wherein the base operating system image comprises a first set of one or more binary files necessary to deploy the base operating system in the virtual machine;

determining one or more middleware services, of the plurality of middleware services, that are not available on the base operating system image, based on a delta list of files and services determined by comparing a first set of files and services available on the base operating system image with a second plurality of files and services required by the workload;

determining locations of a second set of one or more binary files for the one or more middleware services by the at least one computing processor, the second set of one or more binary files stored in a repository within the storage system;

cloning a virtual disk containing the base operating system image;

storing the cloned virtual disk on the same storage system storing the repository by the at least one computing processor;

temporarily mounting the cloned virtual disk via the target hypervisor;

modifying the cloned virtual disk by copying the second set of one or more binary files from the locations in the repository into the cloned virtual disk on the storage system by the at least one computing processor, wherein the second set of one or more binary files are copied directly on the storage system and without traversing a network interface;

configuring the mounted cloned virtual disk;

unmounting the cloned virtual disk;

attaching the modified virtual disk to the virtual machine created by the target hypervisor to host the plurality of middleware services, the modified virtual disk comprising the base operating system image and the second set of one or more binary files, the modified virtual disk residing on the same storage system storing the repository;

storing the modified virtual disk containing the base operating system image and the second set of one or more binary files in the repository;

receiving a second request to deploy a second workload with the plurality of middleware services by at least one computing processor;

retrieving the stored virtual disk from the repository, wherein the stored virtual disk comprises the first set of one or more binary files and the second set of one or more binary files, rather than the base operating system image; and attaching the retrieved virtual disk to a second virtual machine created by the target hypervisor to host the plurality of middleware services for the second workload.

2. The method of claim 1, wherein after the virtual machines is deployed and when the virtual machine is booted, the base operating system and the second set of one or more binary files are present.

3. The method of claim 1, wherein the determining the locations of the second set of one or more binary files for the one or more middleware services comprises:

querying the repository stored on the storage system for a previously modified base operating system image matching the delta list; and in response to determining that the previously modified base operating system image does not exist in the repository, determining the locations of the second set of one or more binary files for the one or more middleware services in the repository stored on the storage system.

4. The method of claim 3, wherein the cloning the virtual disk containing the base operating system image on the storage system comprises:

in response to determining that the previously modified base operating system image exists in the repository, cloning the virtual disk containing the previously modified base operating system image in the repository.

* * * * *